(12) United States Patent
Filippov et al.

(10) Patent No.: US 12,061,980 B2
(45) Date of Patent: Aug. 13, 2024

(54) EFFECTIVE REPRESENTATION OF COMPLEX THREE-DIMENSIONAL SIMULATION RESULTS FOR REAL-TIME OPERATIONS

(71) Applicant: Landmark Graphics Corporation, Houston, TX (US)

(72) Inventors: Andrey Filippov, Houston, TX (US); Jianxin Lu, Bellaire, TX (US); Avinash Wesley, New Caney, TX (US); Keshava P. Rangarajan, Sugarland, TX (US); Srinath Madasu, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 162 days.

(21) Appl. No.: 16/642,452

(22) PCT Filed: Dec. 26, 2017

(86) PCT No.: PCT/US2017/068443
§ 371 (c)(1),
(2) Date: Feb. 27, 2020

(87) PCT Pub. No.: WO2019/132864
PCT Pub. Date: Jul. 4, 2019

(65) Prior Publication Data
US 2020/0320386 A1    Oct. 8, 2020

(51) Int. Cl.
*G06N 3/08*     (2023.01)
*G06F 30/23*    (2020.01)
(Continued)

(52) U.S. Cl.
CPC ............... *G06N 3/08* (2013.01); *G06F 30/23* (2020.01); *G06F 30/27* (2020.01); *G06F 30/28* (2020.01); *G06T 17/20* (2013.01); *G06F 2113/08* (2020.01)

(58) Field of Classification Search
CPC .......... G06N 3/08; G06F 30/23; G06F 30/27; G06F 30/28; G06F 2113/08; G06F 30/00;
(Continued)

(56) References Cited

U.S. PATENT DOCUMENTS 7,613,665 B2    11/2009   Chen et al.
9,081,934 B2     7/2015   Chevalier
(Continued)

FOREIGN PATENT DOCUMENTS

CN    106408086 A    2/2017
CN    107480611 A    12/2017
(Continued)

OTHER PUBLICATIONS

A.B. Farimani, et al., "Deep Learning the Physics of Transport Phenomena," Dept. of Chemistry, Stanford University, (Sep. 2017) arXiv:1709.02432v1 (Year: 2017).*
(Continued)

*Primary Examiner* — Steven W Crabb
(74) *Attorney, Agent, or Firm* — Michael Jenney; Parker Justiss, P.C.

(57) ABSTRACT

System and methods for training neural network models for real-time flow simulations are provided. Input data is acquired. The input data includes values for a plurality of input parameters associated with a multiphase fluid flow. The multiphase fluid flow is simulated using a complex fluid dynamics (CFD) model, based on the acquired input data. The CFD model represents a three-dimensional (3D) domain for the simulation. An area of interest is selected within the
(Continued)

3D domain represented by the CFD model. A two-dimensional (2D) mesh of the selected area of interest is generated. The 2D mesh represents results of the simulation for the selected area of interest. A neural network is then trained based on the simulation results represented by the generated 2D mesh.

17 Claims, 13 Drawing Sheets

(51) Int. Cl.
　　*G06F 30/27*　　　(2020.01)
　　*G06F 30/28*　　　(2020.01)
　　*G06F 113/08*　　(2020.01)
　　*G06T 17/20*　　　(2006.01)

(58) Field of Classification Search
　　CPC ...... G06F 30/25; G06F 30/367; G06F 30/398; G06F 2111/00; G06F 2119/22; G06F 30/20; G06F 30/10; G06F 30/12; G06T 17/20; E21B 43/00; E21B 41/0092
　　See application file for complete search history.

(56) References Cited

U.S. PATENT DOCUMENTS

| | | | |
|---|---|---|---|
| 9,187,984 | B2 | 11/2015 | Usadi et al. |
| 9,284,820 | B2* | 3/2016 | Shetty .............. G01V 99/005 |
| 2002/0082815 | A1 | 6/2002 | Rey-Fabret et al. |
| 2006/0025975 | A1* | 2/2006 | Rey-Fabret .......... G05B 17/02 |
| | | | 703/9 |
| 2012/0211228 | A1 | 8/2012 | Troshko et al. |
| 2012/0226484 | A1 | 9/2012 | Nam et al. |
| 2015/0194062 | A1 | 7/2015 | Oswald et al. |
| 2016/0377462 | A1 | 12/2016 | Ke et al. |
| 2017/0319984 | A1 | 11/2017 | Oshinowo |
| 2020/0364388 | A1* | 11/2020 | Umetani .................. G06N 3/02 |

FOREIGN PATENT DOCUMENTS

| | | |
|---|---|---|
| WO | WO 2015/110599 A1 | 7/2015 |
| WO | WO-2017188858 A1 * | 11/2017 |

OTHER PUBLICATIONS

J.N. Kutz, "Deep learning in fluid dynamics," *J. Fluid Mech.* (Mar. 2017), vol. 814, pp. 1-4 (Year: 2017).*

Filippov et al., "Metamodeling for Real Time Evaluation of Gaseous Leak Dispersion," *Landmark Innovation Forum and Expo* (*LIFE*), held Aug. 22-24, 2017.

International Search Report and Written Opinion issued for International Patent Application No. PCT/US2017/068443, dated Sep. 21, 2018, 11 pages.

Tompson et al., "Accelerating Eulerian Fluid Simulation with Convolutional Networks," *ICML '17: Proceedings of the 34th International Conference on Machine Learning*, vol. 70, Aug. 2017, pp. 3424-3433.

Lu, et al., "Dispersion of Relief and Leaked Hazardous Gases on Offshore Facilities," *SPE Latin American and Caribbean Health, Safety, Environment and Sustainability Conference*, held in Bogotá, Colombia, Jul. 7-8, 2015.

Pandey, "Deep Learning for Static Reservoir Modeling," *Landmark Innovation Forum and Expo* (*LIFE*), held Aug. 22-24, 2017.

* cited by examiner

EFFECTIVE REPRESENTATION OF COMPLEX THREE-DIMENSIONAL SIMULATION RESULTS FOR REAL-TIME OPERATIONS

CROSS-REFERENCE TO RELATED APPLICATION

The present application is a U.S. National Stage patent application of International Patent Application No. PCT/US2017/068443, filed on Dec. 26, 2017, the benefit of which is claimed and the disclosure of which is incorporated herein by reference in its entirety.

FIELD OF THE DISCLOSURE

The present disclosure relates generally to computer simulation of multiphase fluid flows, and particularly, to numerical modeling techniques for simulating multiphase fluid flows in complex real-world systems.

BACKGROUND

A variety of industrial processes, including many operations in the oil and gas industry, often require real-time assessment and quick prediction of multiphase fluid flows. However, real-time simulation of complex industrial and natural processes involving multiphase flows poses a number of challenges, which usually make first-principle numerical computing impractical. Due to the overall complexity of multiphase flow simulation, substantially more time and computing resources may be required to simulate multiphase flows relative to single phase flows. To effectively simulate multiphase flows for complex fluid systems in the oil and gas industry, detailed numerical models of formation and fluid property characteristics across large multi-dimensional domains of interest may be needed.

One way of addressing these challenges may be to use a neural network model with multiple layers of neurons or nodal points to account for multi-scale structures of fluid flows. However, conventional neural network modeling techniques typically require complex a detailed understanding of fluid properties across multiple dimensions and domains. Consequently, such conventional techniques may pose similar challenges that make them impractical for real-time oil and gas applications.

DESCRIPTION OF ILLUSTRATIVE EMBODIMENTS

Figure 1:
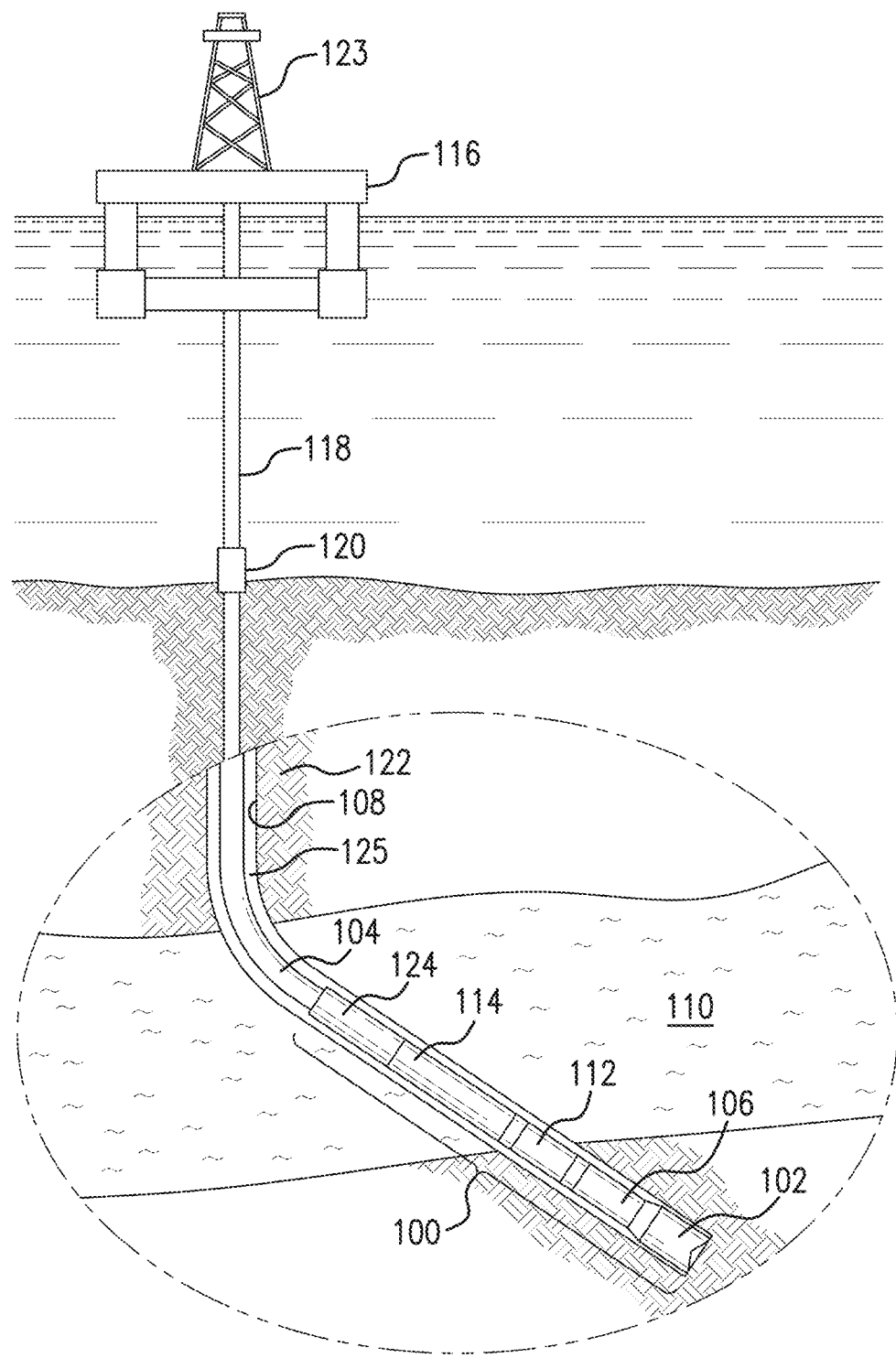
FIG. 1 is a diagram of an offshore drilling system in accordance with one or more embodiments of the present disclosure.

Embodiments of the present disclosure relate to using neural network models for real-time optimization of downhole parameters for drilling operations. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

Illustrative embodiments and related methodologies of the present disclosure are described below in reference to FIGS. 1-13 as they might be employed, for example, in a computer system for real-time simulation of multiphase fluid flows associated with various types of wellsite operations. Examples of such flows include, but are not limited to, flows of hydrocarbons in reservoirs during hydraulic fracturing or well-testing and flows of contaminated air near a drilling rig during the unplanned gas releases. In some implementations, such a computer system may be part of a larger system for monitoring and control of wellsite operations. Such a wellsite operation may be, for example, a multistage hydraulic fracturing operation or other type of stimulation treatment operation performed over different stages along a path of a wellbore through a reservoir formation. Each stage of such a treatment operation may involve, for example, injecting treatment fluid into the surrounding formation via a plurality of formation entry points or "perforation clusters" along the well path. In one or more embodiments, real-time data acquired over each stage of the operation may be applied as inputs to a neural network or neural network based model for performing a simulation of multiphase fluid flows within a corresponding portion of the wellbore and surrounding formation. The results of the flow simulation may then be used to estimate optimal values of one or more parameters for a subsequent stage of the operation to be performed along the wellbore. Such parameters may include, for example and without limitation, an injection pressure or rate of treatment fluid, an amount and injection rate of diverter, and other treatment control parameters.

In one or more embodiments, the neural network may be a deep-learning neural network (DNN), which is trained based on the results of a multiphase flow simulation performed using a computational fluid dynamics (CFD) model. The CFD model may be a numerical model representing complex profiles of the physical and chemical properties of a specified domain within a three-dimensional (3D) space, e.g., a 3D domain representing an area of a reservoir formation surrounding a wellbore or an area surrounding a drilling rig. The DNN may be trained such that the number of nodal points, features and dimensions represented in the original CFD model are substantially reduced. As will be described in further detail below, the training dataset used to train the DNN may be a simplified or streamlined version of the complex profiles represented in the CFD model for a particular domain or formation area of interest. The trained DNN may then be used in place of the CFD model for performing real-time multiphase flow simulations during the wellsite operation. This allows the approximation power and speed of a deep-learning model to be combined with the precision of a CFD model to obtain both fast and highly realistic simulations of complex fluid flows for real time applications.

Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1 is a diagram of an offshore drilling system for a subsea drilling operation. As shown in FIG. 1, a bottomhole assembly (BHA) 100 includes a drill bit 102 coupled to the distal end of the drill string 104. Various logging-while-drilling (LWD) and measuring-while-drilling (MWD) tools may also be coupled within the BHA 100. The distinction between LWD and MWD is sometimes blurred in the industry, but for purposes of this specification and claims LWD tools measure properties of the surrounding formation (e.g., resistivity, porosity, permeability), and MWD tools measure properties associated with the borehole (e.g., inclination, and direction). In the example system, a logging tool 106 may be coupled just above the drill bit, where the logging tool may read data associated with the borehole 108 (e.g., MWD tool), or the logging tool 106 may read data associated with the surrounding formation (e.g., a LWD tool). In some cases, the BHA 100 may comprise a mud motor 112. The mud motor 112 may derive energy from drilling fluid flowing within the drill string 104 and, from the energy extracted, the mud motor 112 may rotate the drill bit 102 (and if present the logging tool 106) separate and apart from rotation imparted to the drill string by surface equipment. Additional logging tools may reside above the mud motor 112 in the drill string, such as illustrative logging tool 114.

The BHA 100 is lowered from a drilling platform 116 by way of the drill string 104. The drill string 104 extends through a riser 118 and a well head 120. Drilling equipment supported within and around derrick 123 (illustrative drilling equipment discussed in greater detail with respect to FIG. 2) may rotate the drill string 104, and the rotational motion of the drill string 104 and/or the rotational motion created by the mud motor 112 causes the bit 102 to form the borehole 108 through the formation material 122. The volume defined between the drill string 104 and the borehole 108 is referred to as the annulus 125. The borehole 108 penetrates subterranean zones or reservoirs, such as reservoir 110, believed to contain hydrocarbons in a commercially viable quantity.

The BHA 100 may further comprise a communication subsystem including, for example, a telemetry module 124. Telemetry module 124 may communicatively couple to the various logging tools 106 and 114 and receive logging data measured and/or recorded by the logging tools 106 and 114. The telemetry module 124 may communicate logging data to the surface using any suitable communication channel (e.g., pressure pulses within the drilling fluid flowing in the drill string 104, acoustic telemetry through the pipes of the drill string 104, electromagnetic telemetry, optical fibers embedded in the drill string 104, or combinations). Likewise, the telemetry module 124 may receive information from the surface over one or more of the communication channels.

Figure 2:
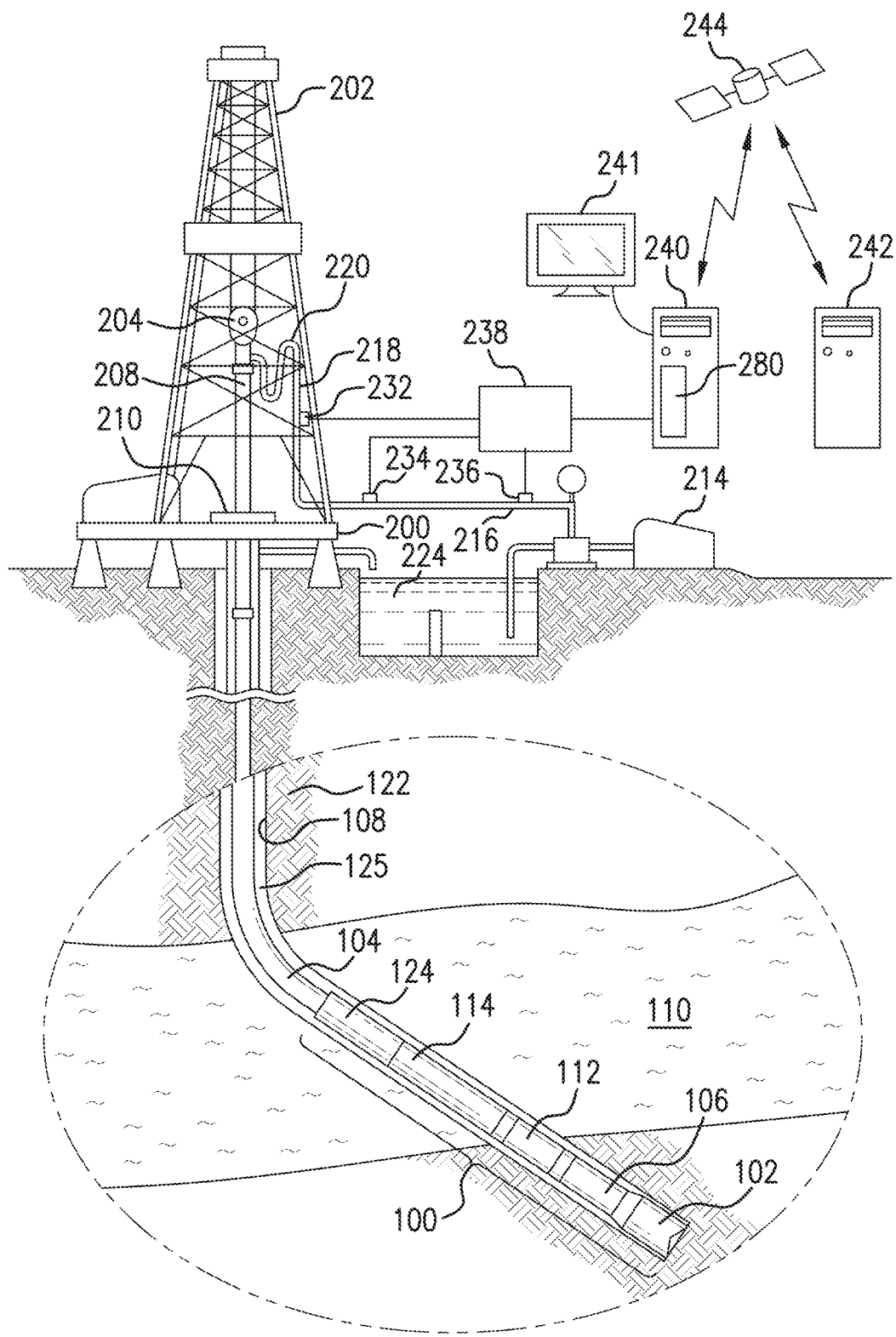
FIG. 2 is a diagram of an onshore drilling system in accordance with one or more embodiments of the present disclosure.

FIG. 2 is a diagram of an onshore drilling system for performing a land-based drilling operation. As shown in FIG. 2, a drilling platform 200 is equipped with a derrick 202 that supports a hoist 204. The hoist 204 suspends a top drive 208, which rotates and lowers the drill string 104 through the wellhead 210. Drilling fluid is pumped by mud pump 214 through flow line 216, stand pipe 218, goose neck 220, top drive 208, and down through the drill string 104 at high pressures and volumes to emerge through nozzles or jets in the drill bit 102. The drilling fluid then travels back up the wellbore via the annulus 125, through a blowout preventer (not specifically shown), and into a mud pit 224 on the surface. At the surface of the wellsite, the drilling fluid is cleaned and then circulated again by mud pump 214. The drilling fluid is used to cool the drill bit 102, to carry cuttings from the base of the borehole to the surface, and to balance the hydrostatic pressure in the rock formations.

In the illustrative case of the telemetry mode 124 encoding data in pressure pulses that propagate to the surface, one or more transducers, e.g., one or more of transducers 232, 234, and 236, convert the pressure signal into electrical signals for a signal digitizer 238 (e.g., an analog-to-digital converter). While only transducers 232, 234, and 236 are illustrated, any number of transducers may be used as desired for a particular implementation. The digitizer 238 supplies a digital form of the pressure signals to a surface computer system 240 or some other form of a data processing device located at the surface of the wellsite.

In one or more embodiments, the surface computer system 240 may operate in accordance with computer-executable instructions, which may be stored in a memory or other computer-readable storage medium coupled to a processor of the surface computer system 240. Such instructions may be used, for example, to configure the surface computer system 240 to process and decode the downhole signals received from the telemetry mode 124 via digitizer 238. Such instructions may also be used to configure the surface computer system 240 to perform the optimized neural network training techniques disclosed herein for real-time multiphase fluid flow simulations.

In one or more embodiments, real-time data collected at the wellsite, including the downhole logging data from the telemetry module 124, may be displayed on a display device 241 coupled to the computer system 240. The representation of the wellsite data may be displayed using any of various display techniques, as will be described in further detail below. In some implementations, the surface computer system 240 may generate a two-dimensional (2D) or three-dimensional (3D) graphical representation of the wellsite data for display on the display device 241 a graphic. The graphical representation of the wellsite data may be displayed with a representation of the planned well path for enabling a user of the computer system 240 to visually monitor or track different stages of the drilling operation along the planned path of the well.

In one or more embodiments, the representations of the wellsite data and planned well path may be displayed within a graphical user interface (GUI) of a geosteering or well engineering application 280 executable at the surface computer system 240. Well engineering application 280 may provide, for example, a set of data analysis and visualization tools for well planning and control. Such tools may allow the user to monitor different stages of the drilling operation and adjust the planned well path as needed, e.g., by manually adjusting one or more controllable parameters via the GUI of well engineering application 280 to control the direction and/or orientation of drill bit 102 and well path. Alternatively, the monitoring and control of the drilling operation may be performed automatically, without any user intervention, by well engineering application 280.

For example, as each stage of the drilling operation is performed and a corresponding portion of the well is drilled along its planned path, well engineering application 280 may receive indications of downhole operating conditions and values of controllable parameters used to control the drilling of the well during the operation. Examples of such controllable parameters include, but are not limited to, WOB, drilling fluid injection or flow rate and pressure (within the drill pipe), rotational speed of the drill string and/or drill bit (e.g., rotational rate applied by the top drive unit and/or a downhole motor), and the density and viscosity of the drilling fluid. In response to receiving indications of downhole operating conditions during a current stage of the drilling operation, the surface computer system 240 may automatically send control signals to one or more downhole devices (e.g., a downhole geosteering tool) in order to adjust the planned path of the well for subsequent stages of the operation. The control signals may include, for example, optimized values of one or more controllable parameters for performing the subsequent stages of the drilling operation along the adjusted path of the well.

In one or more embodiments, some or all of the calculations and functions associated with the manual or automated monitoring and control of the drilling operation at the wellsite may be performed by a remote computer system 242 located away from the wellsite, e.g., at an operations center of an oilfield services provider. In some implementations, the functions performed by the remote computer system 242 may be based on real-time data received from the wellsite computer system 240 via a communication network. Such a network may be, for example, a local-area, medium-area, or wide-area network, e.g., the Internet. As illustrated in the example of FIG. 2, the communication between computer system 240 and computer system 242 may be over a satellite 244 link. However, it should be appreciated that embodiments are not limited thereto and that any suitable form of communication may be used as desired for a particular implementation.

While not shown in FIG. 2, the remote computer system 242 may execute an application similar to the well engineering application 280 of system 240 for implementing all or a portion of the above-described wellsite monitoring and control functionality. For example, such functionality may be implemented using only the well engineering application 280 executable at system 240 or using only the well engineering application executable at the remote computer system 242 or using a combination of the well engineering applications executable at the respective computer systems 240 and 242 such that all or portion of the wellsite monitoring and control functionality may be spread amongst the available computer systems.

While the drilling systems of FIGS. 1 and 2 are described in the context of a single well and wellsite, it should be appreciated that embodiments are not intended to be limited thereto and that the real-time analysis and optimization techniques disclosed herein may be applied to multiple wells at various sites throughout a hydrocarbon producing field. For example, the remote computer system 242 may be communicatively coupled via a communication network to corresponding wellsite computer systems similar to the computer system 240. The remote computer system 242 in this example may be used to continuously monitor and control drilling operations at the various wellsites by sending and receiving control signals and wellsite data to and from the respective wellsite computer systems via the network.

In one or more embodiments, the wellsite monitoring and control functionality provided by computer system 242 (and/or computer system 240 or well engineering application 280 thereof) may include real-time analysis and optimization of parameters for performing different stages of a drilling operation along the planned well path, as described above. As will be described in further detail below with respect to FIGS. 3-12, the optimized parameters may be based on the results of real-time simulations of multiphase fluid flows using a DNN that has been trained with optimized CFD simulation data.

In one or more embodiments, the results of the multiphase flow simulations using the trained DNN may then be used to estimate optimal values for one or more parameters of the downhole operation. For example, the downhole operation may be a multistage hydraulic fracturing or other type of treatment operation performed over different stages along the wellbore. Real-time data acquired during a particular stage of the operation may be applied as inputs for training or retraining the DNN to efficiently and accurately predict the reservoir pressure depletion in the stimulated volume and estimate optimal values of treatment parameters for performing a subsequent stage of the operation. Such parameters may include, for example and without limitation, an injection pressure or rate of treatment fluid, an amount and injection rate of diverter, and other treatment control parameters, as described above. In this way, the trained DNN may be used to make adjustments to the operation in real time as the operation is performed along the well path.

Figure 3:
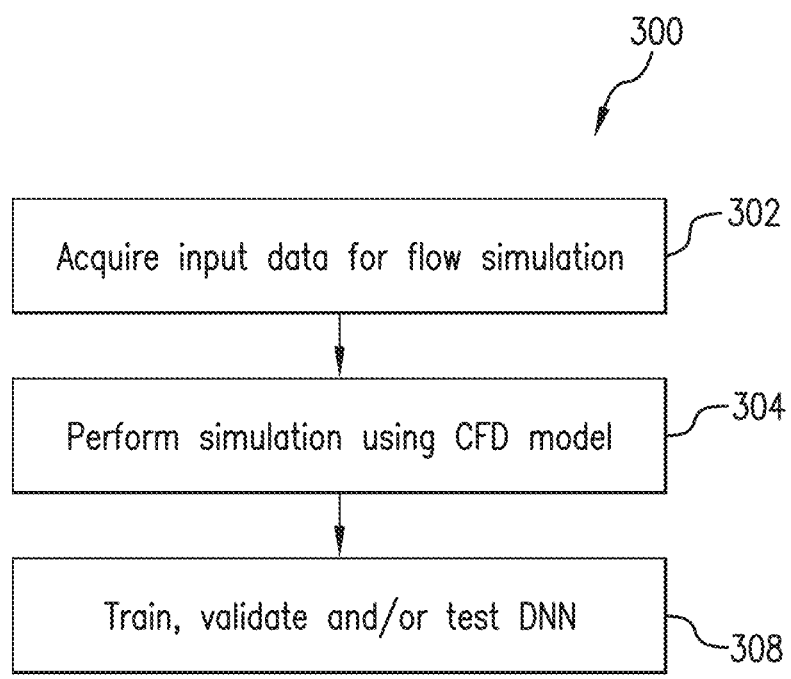
FIG. 3 is a flowchart of a process for training a deep-learning neural network (DNN) model using the results of a computational fluid dynamics (CFD) simulation.

FIG. 3 is a flowchart of a process 300 for training a DNN using the results of a CFD simulation of multiphase fluid flow. As described above, such a flow simulation may be performed using a CFD model representing complex profiles of physical and chemical properties of a specified domain within a three-dimensional (3D) space. As shown in the example of FIG. 3, process 300 begins in block 302, which includes obtaining input data for performing the flow simulation using the CFD model.

In block 304, the simulation may be performed by running the CFD model multiple times for different combinations of input data {X} to produce simulation results {Y}. The simulation results may include, for example, estimated values for one or more multiphase fluid profiles, e.g., profiles of fluid concentrations, pressures and their gradients. In one or more embodiments, the simulation results {Y} may be an array with the following dimensions: $N_{tr} \times N_{nod} \times N_f$ (where $N_{tr}$ is the number of training cases, $N_{nod}$ is the number of nodal points, and $N_f$ is the number of features or the length of the input data vector).

In block 308, a training dataset {X, Y} based on the results array obtained for a given array of inputs may be used for training, validating and/or testing the DNN. As described above, 30 the trained DNN may then be used in place of the CFD model for performing real-time multiphase flow simulations during operations at a wellsite, e.g., fracturing operations over different stages along a path of a wellbore through a reservoir formation. The size of the dimensions of the arrays in the training dataset for the DNN may be dependent upon the size of the domain simulated using the CFD model.

In one or more embodiments, the simulated domain may be represented as a 2D or 3D mesh with multiple nodal points corresponding to different parts of the domain. In many oil and gas applications, the meshes that are typically used for flow simulations, e.g., reservoir flow simulations, may have billions of nodal points. In one or more embodiments, minimization of the nodal points of such a mesh may need to be performed to find coefficients for the DNN before it can be used in place of the CFD model for real-time reservoir flow simulations. Otherwise, the number of DNN coefficients identified from the original mesh associated with the CFD model may exceed the computer processing and memory resources available to perform the proxy flow simulation using the DNN. However, due to the size of the original mesh, there may be difficulty in applying conventional minimization techniques for finding coefficients of such neural network models utilized in flow simulations.

Accordingly, embodiments of the present disclosure may include minimization techniques that provide a substantial reduction of the nodal points used for training the DNN and subsequent flow simulations using the trained DNN. As will be described in further detail below with respect to FIG. 4, the disclosed techniques may be used to optimize the training dataset to include only those profiles of concentrations, pressure and their gradients associated with particular areas of interest within the larger simulated domain of the overall solution. The particular areas of interest may include, for example, areas of the reservoir formation near the wellbore, e.g., one or more fracture networks surrounding different sections of the wellbore. The wellbore sections may correspond to, for example, different stages of a hydraulic fracturing or stimulation treatment operation performed along the path of the wellbore through the formation. The areas of interest may thus represent a relatively small part of the simulated domain. Moreover, the precision of the mesh used to represent the flow parameters associated with features of the formation within these areas may not need to be as fine as that used for the CFD simulation, which provides a further significant reduction of the required memory for the real-time flow simulation using the DNN.

Figure 4:
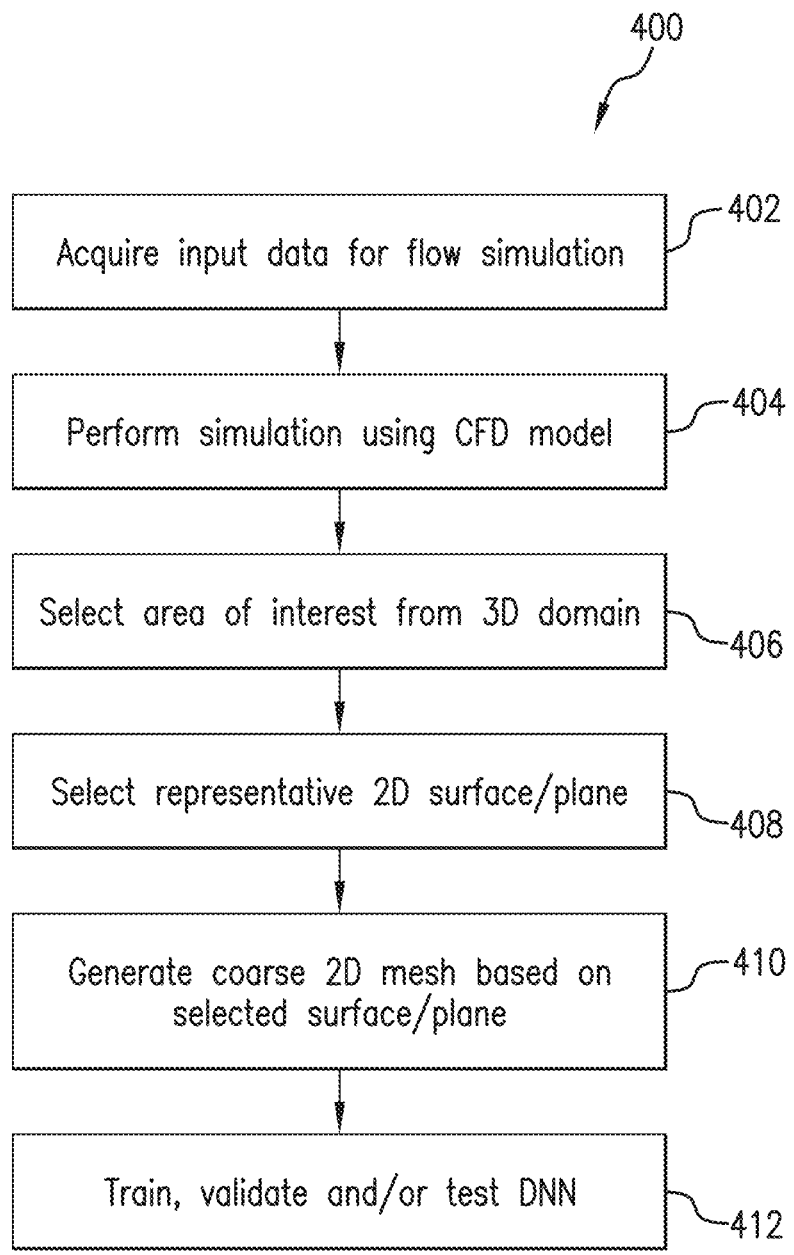
FIG. 4 is a flowchart of another process for training a DNN using an optimized training dataset for real-time flow simulations based on the results of a CFD simulation.

FIG. 4 is a flowchart of a process 400 for training a DNN using an optimized training dataset for real-time flow simulations based on the results of a CFD simulation Like process 300 of FIG. 3, as described above, process 400 may begin in block 402, which includes obtaining input data for a CFD model representing a specified 3D domain, e.g., a reservoir formation, along with complex profiles of physical and chemical properties of such a domain.

In block 404, a multiphase fluid flow simulation may be performed by applying different combinations of input data to the CFD model. For example, the flow simulation may be performed for each combination of input data to produce a corresponding set of simulation results.

In block 406, the simulation results corresponding to one or more areas of interest may be selected from the simulated 3D domain. The selected area(s) may correspond to, for example, one or more targeted areas of the reservoir formation for hydrocarbon production operations to be performed. In one or more embodiments, block 406 may include selecting particular parts of a full 3D mesh representing the 3D domain, e.g., the reservoir formation.

In block 408, one or more representative 2D planar surfaces corresponding to the area(s) of interest may be selected or identified within the 3D mesh or 3D domain represented by the 3D mesh. The 2D planar surface(s) may include simulation data corresponding to the area(s) of interest selected in block 406.

In block 410, a relatively coarse 2D mesh may be generated based on the simulation results associated with the selected/identified 2D surface(s). In one or more embodiments, block 410 may further include applying the simulation data from the 2D surface(s) to the 2D mesh.

In block 412, the nodal points of the 2D mesh generated in block 410 may be used as the training data to train, validate and test a DNN. As a result of using such a course 2D mesh rather than the 3D mesh associated with the original CFD model, the dimensions of the training cases used for training the DNN can be reduced by many orders of magnitude. This reduces memory requirements and greatly improves the efficiency and speed of the DNN training, validation and testing for real-time applications.

Two examples of real-time applications for which the disclosed techniques may be applied will be described below with respect to FIGS. 5-12. In particular, FIGS. 5-7 will be used to describe an example of applying the disclosed techniques for estimating the turbulent dispersion of gaseous contamination near a drillship. FIGS. 8-12 will be used to describe an example of applying these techniques for estimating hydrocarbon production from a production well during a fracturing operation.

Figure 5:
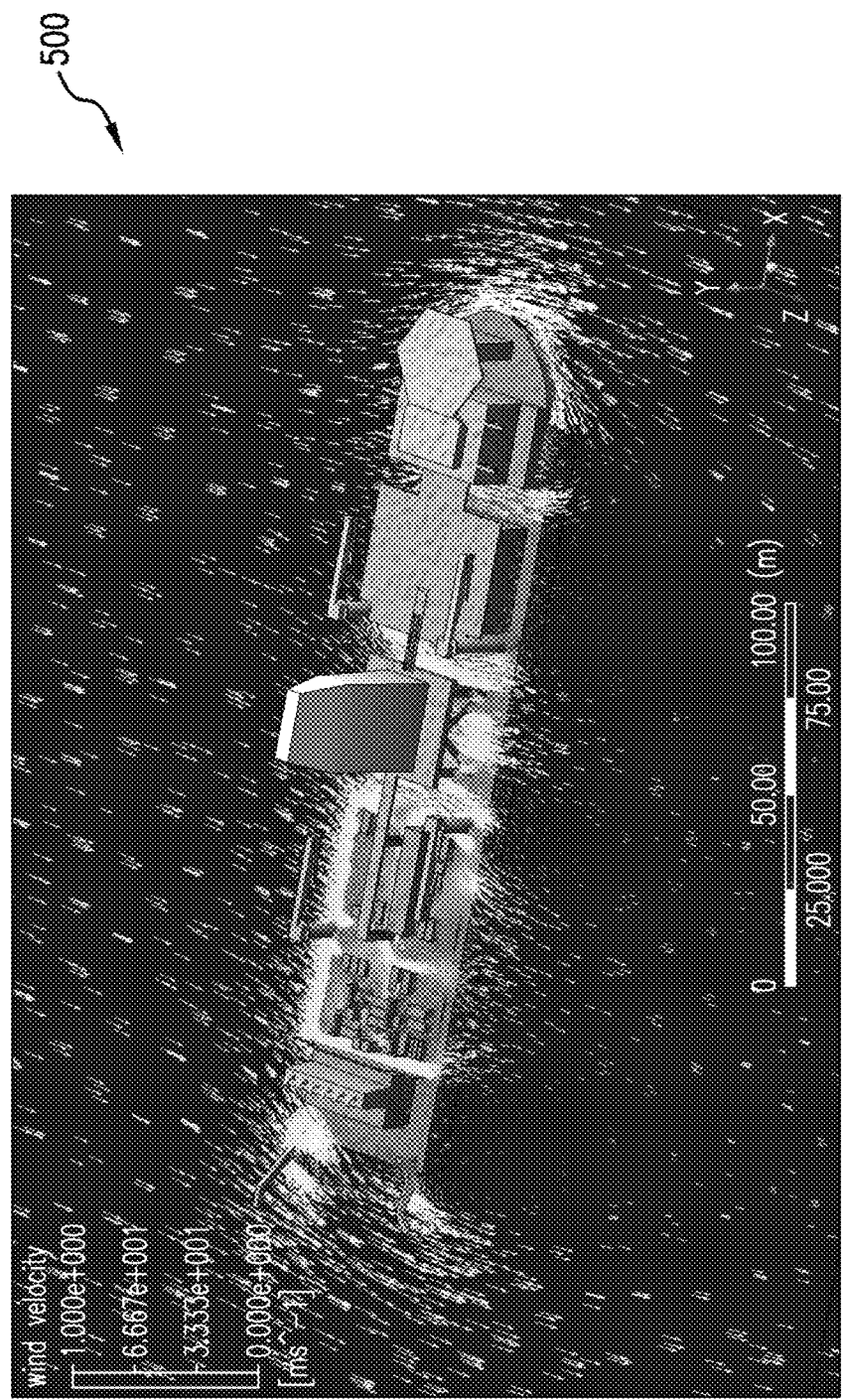
FIG. 5 is a diagram of simulated air flow near a drillship.

FIG. 5 is a diagram of simulated air flow surrounding a drillship 500. A CFD model may be used to find a numerical solution for a convective diffusion equation in a 3D domain surrounding drillship 500. The dimensions of the 3D domain may be several times larger (e.g., 5-6 times larger) than those of drillship 500 itself. The arrows shown in FIG. 5 may represent a calculated airflow velocity vector field near drillship 500. A 3D mesh including many nodal points, e.g., 2-3 million nodal points, may be required to effectively represent the entire domain needed to determine the numerical solution using the CFD model.

Figure 6:
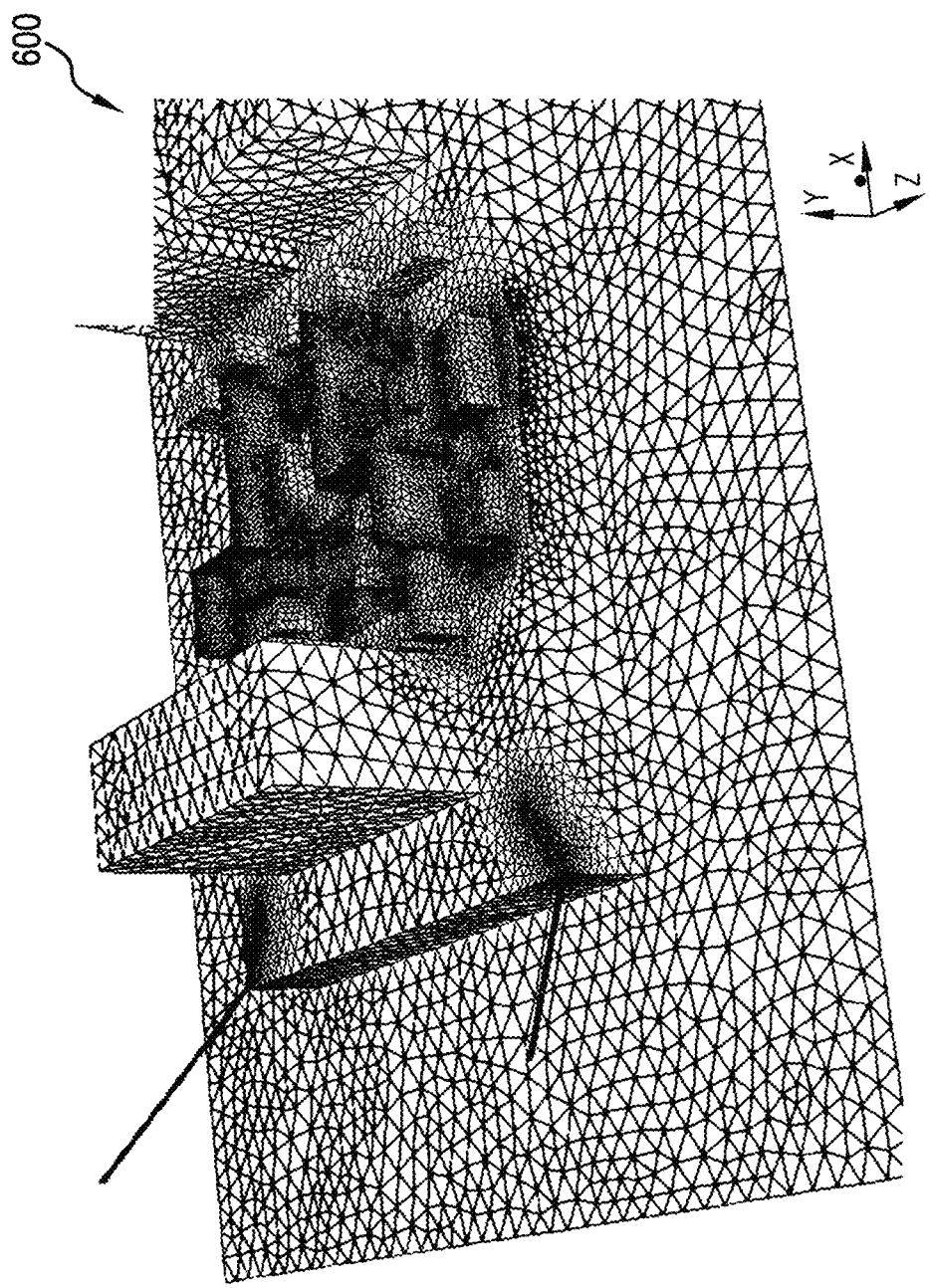
FIG. 6 is a diagram of a surface mesh for an area near the deck of the drillship shown in FIG. 5.

FIG. 6 is a diagram of a surface mesh 600 representing an area near the deck of drillship 500 shown in FIG. 5. The area represented by mesh 600 in this example may be an area of primary interest for predicting levels of contamination during real-time safety applications. Mesh 600 may include only a small portion of the total number of the nodal points of the original 3D mesh, e.g., about 100,000 of the 2-3 million nodal points of the 3D mesh. In most cases, it may be sufficient to estimate contamination profiles associated with a particular area or surface of interest, e.g., an area located one meter above the deck. Therefore, a 2D plane representing this area of interest may be selected from the larger domain represented by mesh 600, and the associated simulation data may be applied or projected onto the nodal points of the plane.

Figure 7:
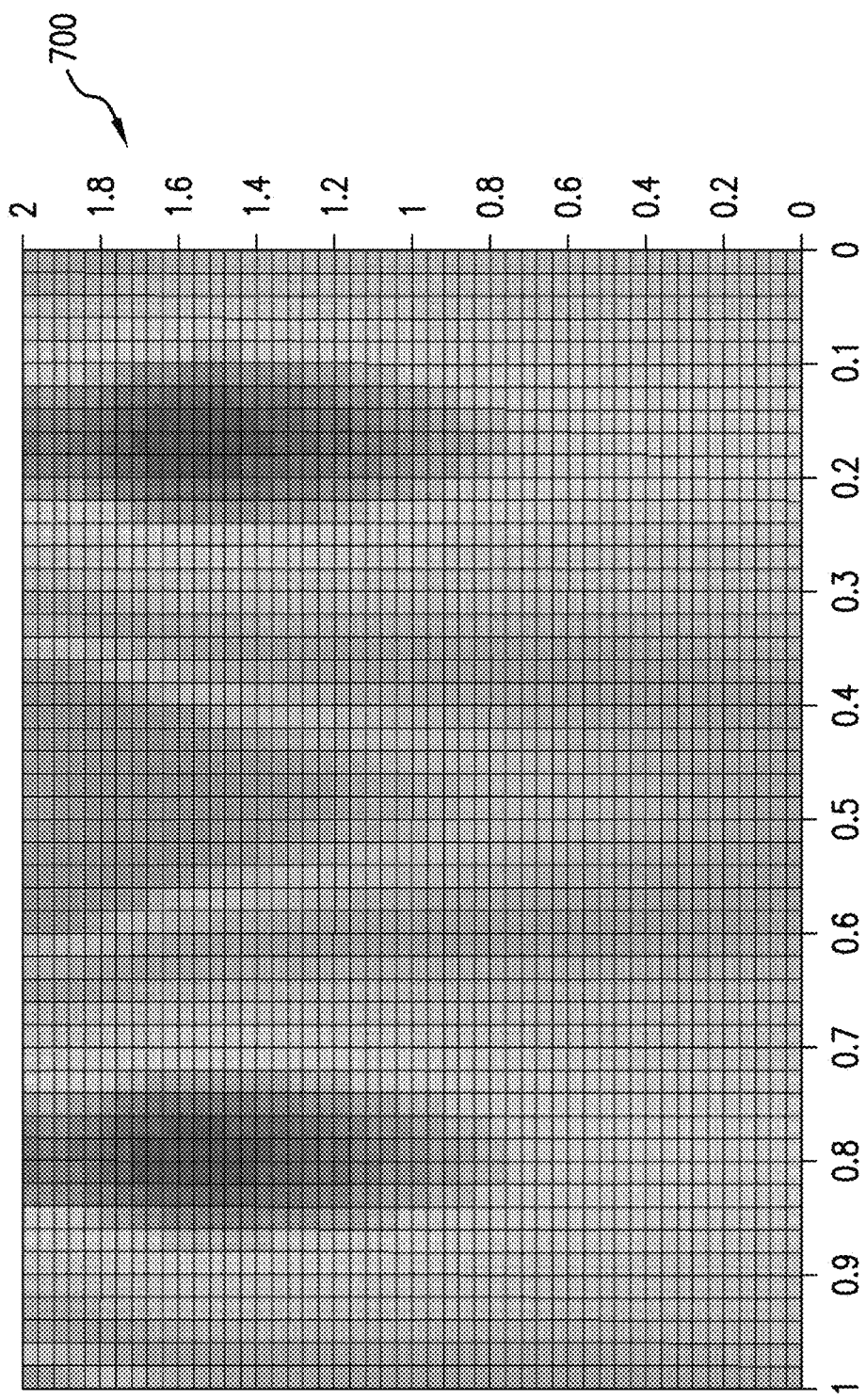
FIG. 7 is a diagram of an illustrative two-dimensional mesh for representing CFD simulation results within a selected domain of interest from which training data for a DNN may be derived.

FIG. 7 is a diagram showing an example of a 2D mesh 700 derived from surface mesh 600 of FIG. 6. 2D mesh 700 may represent, for example, a 2D plane located near the area covered by surface mesh 600 at some distance (e.g., 1 meter) above the deck of drillship 500, as shown in FIG. 5. As shown in FIG. 7, 2D mesh 700 may have an even coarser mesh than that of mesh 600. For example, 2D mesh 700 may include only 2,500 of the 100,000 nodal points of mesh 600. Simulation data representing the CFD simulation results for the selected area of interest may be projected from the 3D domain of mesh 600 onto the 2D mesh of mesh 700. The data projected onto 2D mesh 700 may then be used to derive training data for efficient training of a DNN, as described above. The application of the disclosed data reduction or minimization techniques in this example may result in a reduction of the required memory by a factor of 2,000,000/2,500 or 800.

Figure 8:
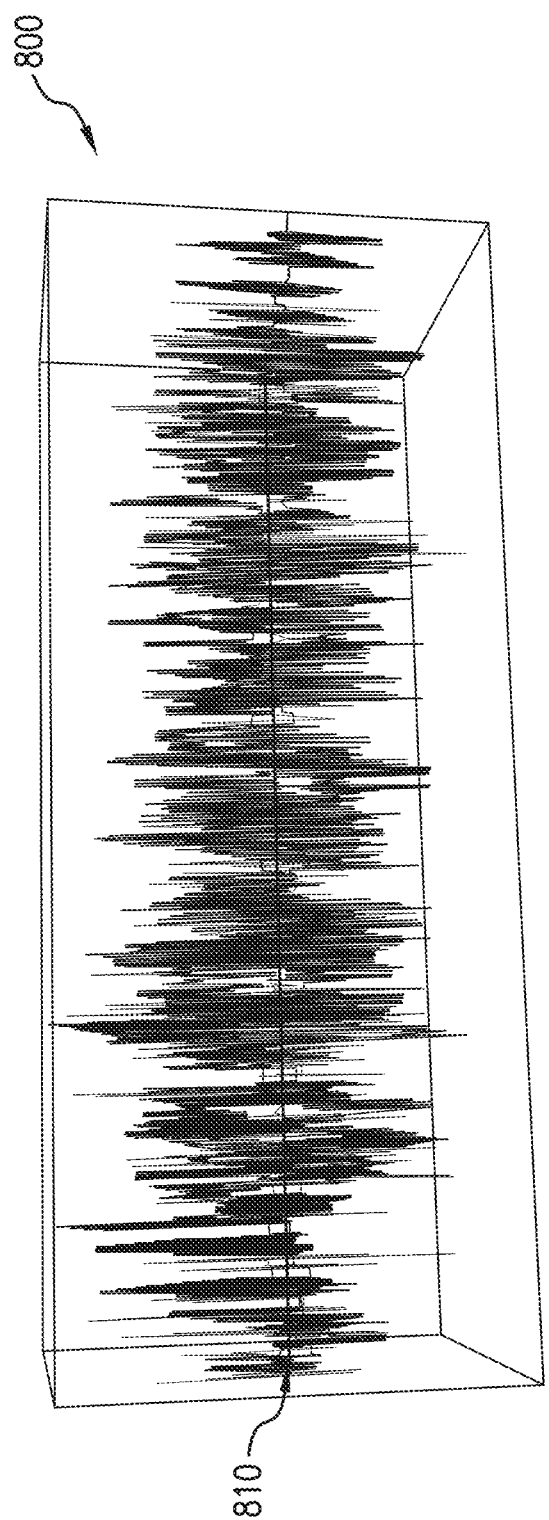
FIG. 8 is a diagram of an illustrative configuration of a Natural Fracture Network (NFN) for hydrocarbon production operations along a wellbore within a reservoir formation.

FIG. 8 is a diagram of an illustrative 3D model 800 of a Natural Fracture Network (NFN) for hydrocarbon production operations along a wellbore 810 within a reservoir formation. The NFN in this example may include over 40 fractures and a very refined mesh may be needed for 3D model 800 effectively representing flow parameters near each of these fractures.

Figure 9:
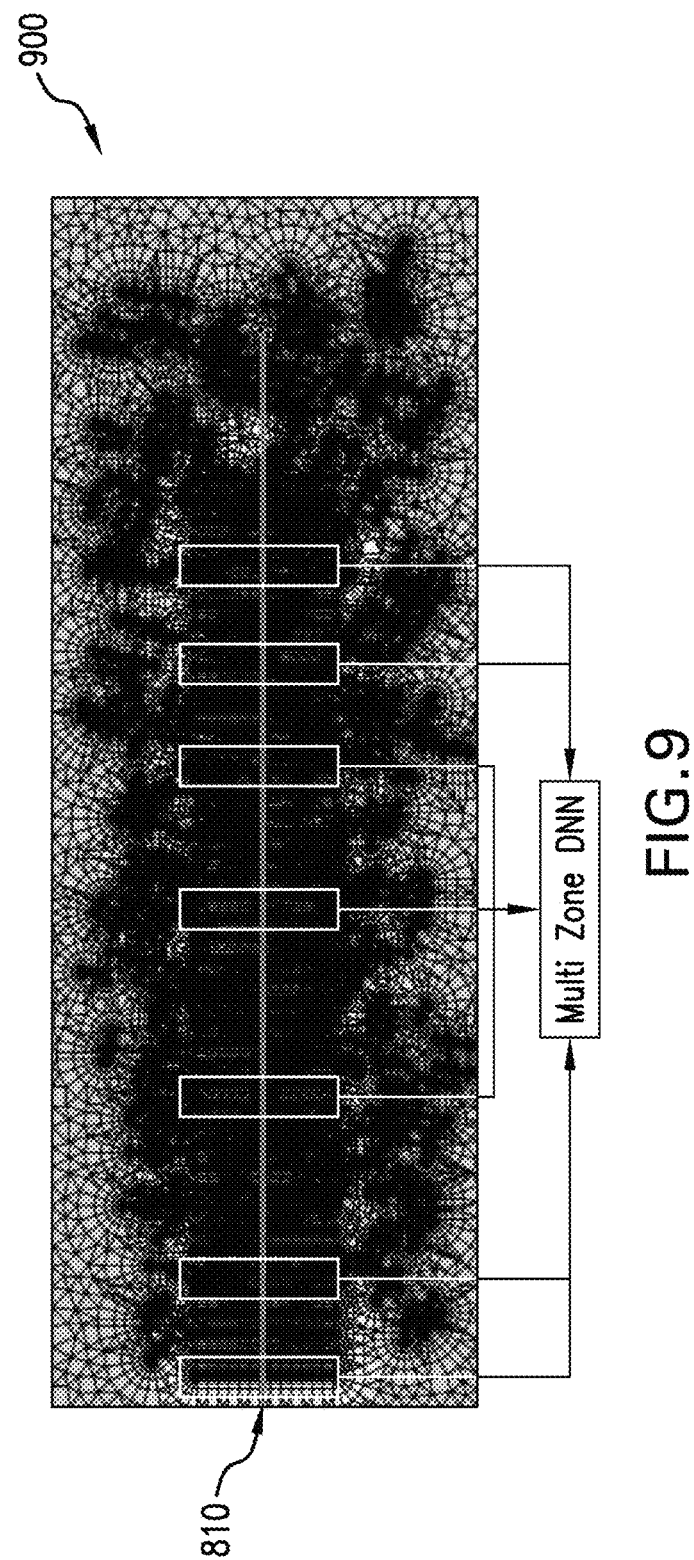
FIG. 9 is a diagram of a computational mesh for performing reservoir flow simulations based on the NFN configuration of FIG. 8.

FIG. 9 is a diagram of a simplified 2D mesh 900 that may be derived from 3D model 800. However, 2D mesh 900 may be simplified even further to efficiently train a DNN for performing a real-time reservoir flow simulation for the NFN and wellbore 810 as shown in FIG. 8. For example, a DNN trained using 2D mesh 900 may have a hidden layer including 100 neurons or nodal points representing simulation data at 100 discrete moments of time. Accordingly, such a DNN may require $101 \times 60000 \times 100 = 6.06 \times 10^8$ coefficients for that layer alone. However, in many situations, some of the parameters, e.g., pressure, may be ignored.

Figure 10:
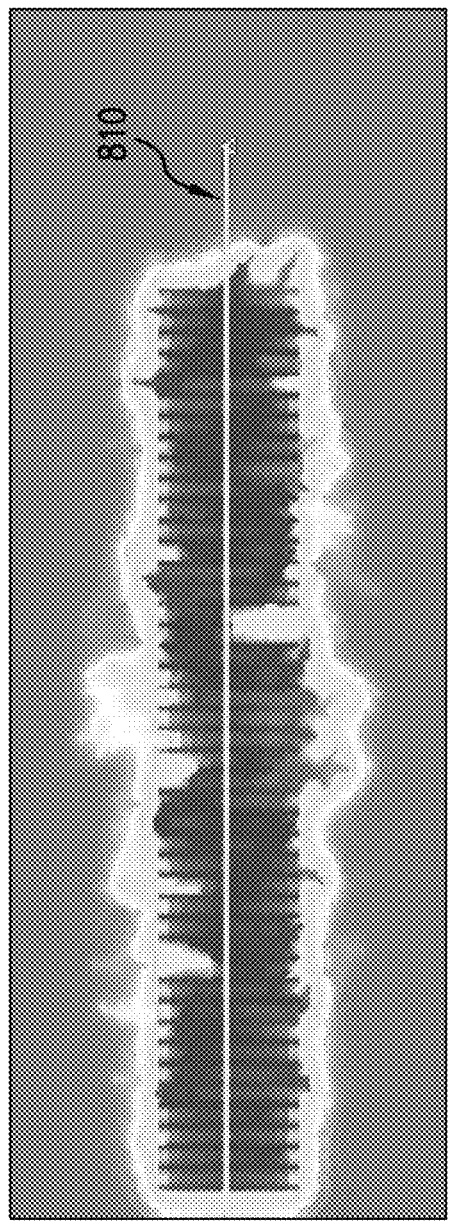
FIG. 10 is a diagram of pressure contours for fracture zones along the wellbore of FIG. 8.

FIG. 10 is a diagram of pressure contours for fracture zones along wellbore 810 of FIG. 8. In some implementations, the pressure information associated with nodal points of 2D mesh 900 that correspond to only these fracture zones may be considered for the flow simulation. For example, by focusing on only those parameters that may cause production fluxes to individual fractures in the fracture zones of interest, the number of corresponding coefficients of the DNN may be substantially reduced, e.g., to $101 \times 40 \times 100 = 4.04 \times 10^5$, thereby making the DNN easier to train and use. The number of coefficients and efficiency of the DNN model may be reduced even further by limiting the simulation to a particular output parameter of interest, e.g., a production rate of gas over time. In this case, the number of coefficient at the last hidden layer may be reduced to only $101 \times 100 = 1.01 \times 10^4$.

Figure 11:
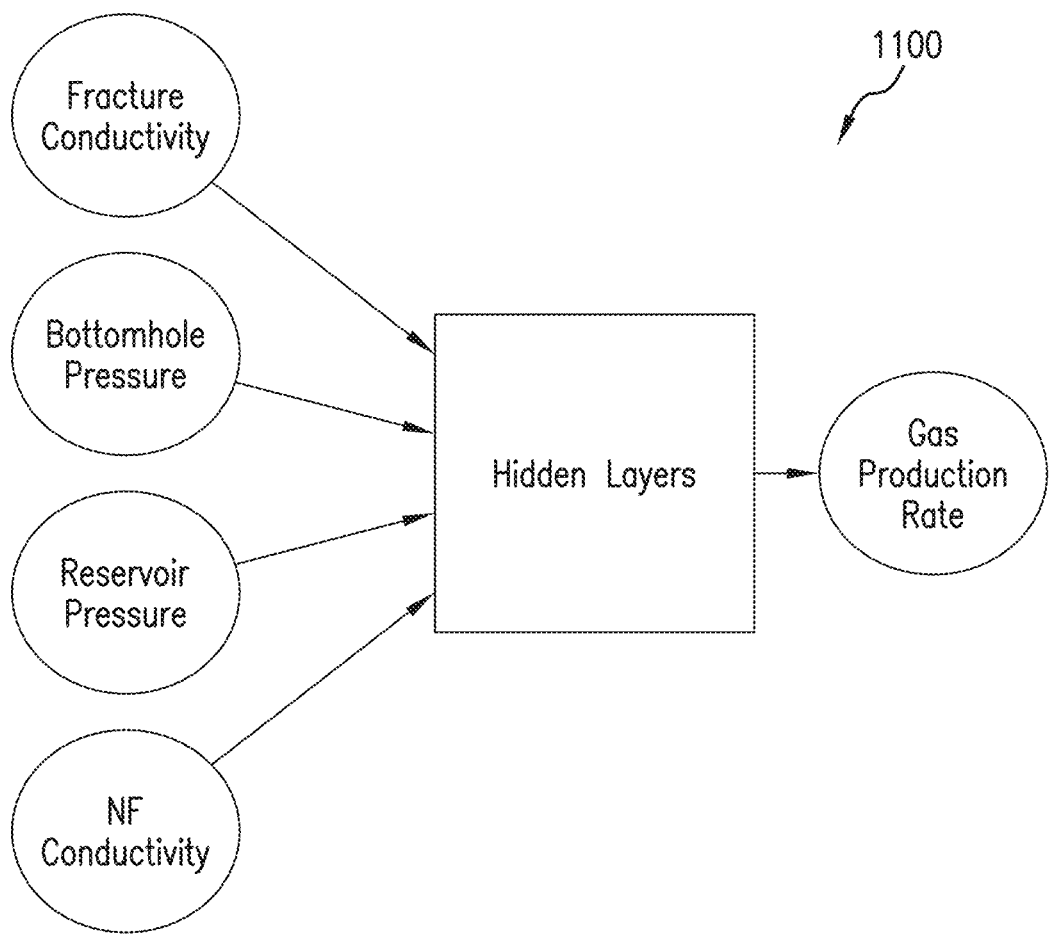
FIG. 11 is a schematic of input and output variables for training a DNN.

FIG. 11 is a schematic of input and output parameters for training a DNN 1100, according to the minimization techniques applied to the parameters as described above for this example. As shown in FIG. 11, DNN 1100 may be trained to produce an estimated or predicted gas production rate based on various input parameters including, for example and without limitation, fracture conductivity, bottomhole pressure, reservoir pressure and natural fracture (NF) conductivity. However, it should be appreciated that embodiments are not limited thereto and that any of various input and output parameters may be used for training DNN 1100.

Figure 12:
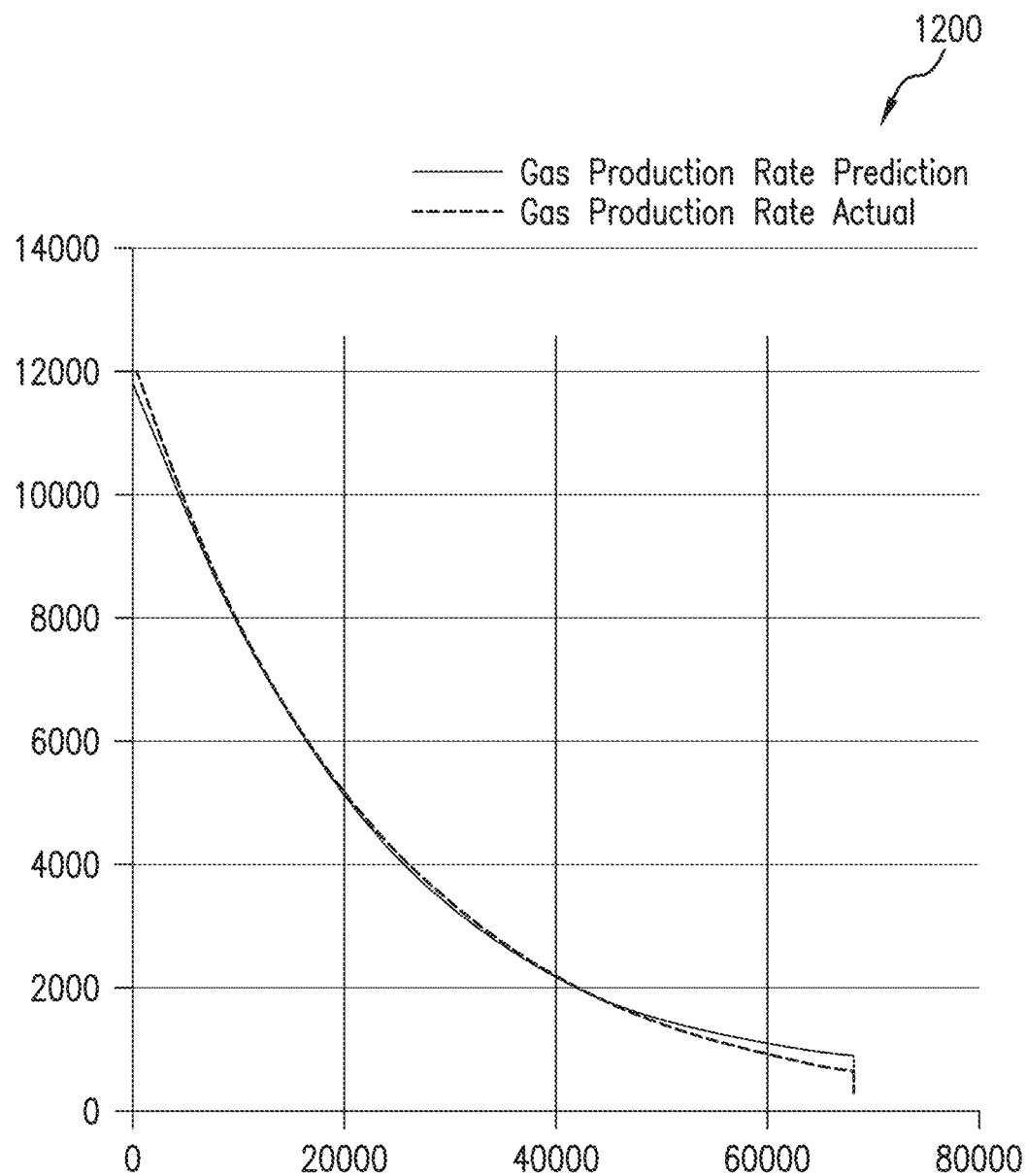
FIG. 12 is a plot graph showing a comparison between a predicted rate of gas production produced by a trained DNN and the actual rate of gas production over a period of time.

FIG. 12 is a plot graph 1200 showing a comparison between a predicted rate of gas production, e.g., as produced by DNN 1100 after it is trained, and the actual rate of gas production over a period of time.

Figure 13:
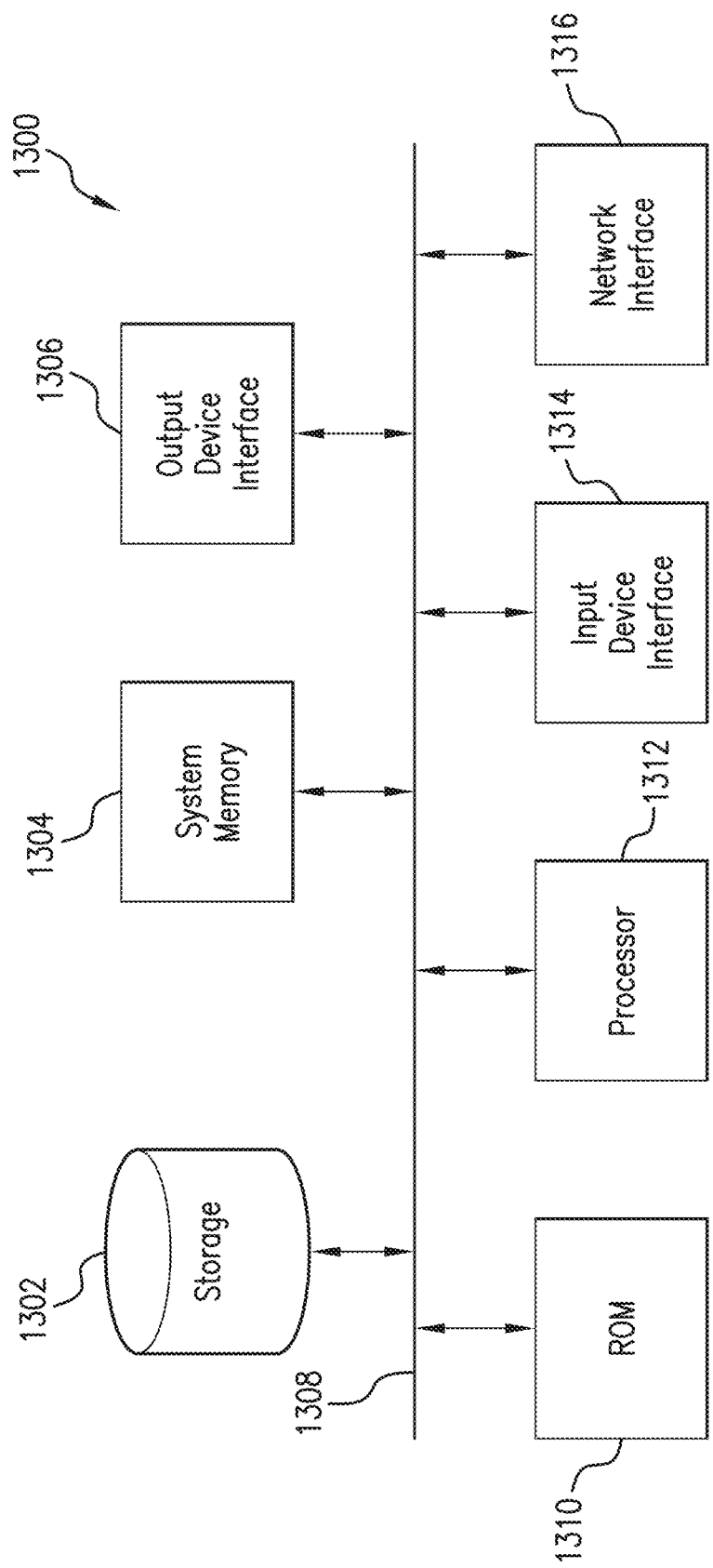
FIG. 13 is a block diagram of an illustrative computer system in which one or more embodiments may be implemented.

FIG. 13 is a block diagram of an exemplary computer system 1300 in which embodiments of the present disclosure may be implemented. For example, computer system 240 of FIG. 2, as described above, may be implemented using system 1300. System 1300 can be a computer, phone, PDA, or any other type of electronic device. Such an electronic device includes various types of computer readable media and interfaces for various other types of computer readable media. As shown in FIG. 13, system 1300 includes a permanent storage device 1302, a system memory 1304, an output device interface 1306, a system communications bus 1308, a read-only memory (ROM) 1310, processing unit(s) 1312, an input device interface 1314, and a network interface 1316.

Bus 1308 collectively represents all system, peripheral, and chipset buses that communicatively connect the numerous internal devices of system 1300. For instance, bus 1308 communicatively connects processing unit(s) 1312 with ROM 1310, system memory 1304, and permanent storage device 1302.

From these various memory units, processing unit(s) 1312 retrieves instructions to execute and data to process in order to execute the processes of the subject disclosure. The processing unit(s) can be a single processor or a multi-core processor in different implementations.

ROM 1310 stores static data and instructions that are needed by processing unit(s) 1312 and other modules of system 1300. Permanent storage device 1302, on the other hand, is a read-and-write memory device. This device is a non-volatile memory unit that stores instructions and data even when system 1300 is off. Some implementations of the subject disclosure use a mass-storage device (such as a magnetic or optical disk and its corresponding disk drive) as permanent storage device 1302.

Other implementations use a removable storage device (such as a floppy disk, flash drive, and its corresponding disk drive) as permanent storage device 1302. Like permanent storage device 1302, system memory 1304 is a read-and-write memory device. However, unlike storage device 1302, system memory 1304 is a volatile read-and-write memory, such a random access memory. System memory 1304 stores some of the instructions and data that the processor needs at runtime. In some implementations, the processes of the subject disclosure are stored in system memory 1304, permanent storage device 1302, and/or ROM 1310. For example, the various memory units include instructions for various functions or operations in accordance with processes 300 and 400 of FIGS. 3 and 4, respectively, as described above. From these various memory units, processing unit(s) 1312 retrieves instructions to execute and data to process in order to execute the processes of some implementations.

Bus 1308 also connects to input and output device interfaces 1314 and 1306. Input device interface 1314 enables the user to communicate information and select commands to the system 1300. Input devices used with input device interface 1314 include, for example, alphanumeric, QWERTY, or T9 keyboards, microphones, and pointing devices (also called "cursor control devices"). Output device interfaces 1306 enables, for example, the display of images generated by the system 1300. Output devices used with output device interface 1306 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 13, bus 1308 also couples system 1300 to a public or private network (not shown) or combination of networks through a network interface 1316. Such a network may include, for example, a local area network ("LAN"), such as an Intranet, or a wide area network ("WAN"), such as the Internet. Any or all components of system 1300 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, processes 300 and 400 of FIGS. 3 and 4, as described above, may be implemented using system 1300 or any computer system having processing circuitry or a computer program product including instructions stored therein, which, when executed by at least one processor, causes the processor to perform functions relating to these processes.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the exemplary methodologies described herein may be implemented by a system including processing circuitry or a computer program product including instructions which, when executed by at least one processor, causes the processor to perform any of the methodology described herein.

As described above, embodiments of the present disclosure are particularly useful for quickly evaluating pressure distribution and flow rates in reservoirs and wellbores for real-time drilling and/or fracturing operations. Accordingly, advantages of the present disclosure include training a Machine Learning (ML) model (e.g., neural networks, including DNNs) to recognize patterns between the inputs and outputs of engineering simulations of multiphase fluid flows in the reservoir and wellbore. Once trained, the ML model may be used in place of more complex models (e.g., CFD models, as described above) to predict the outputs or results of the multiphase flow simulation during real-time operations. Such ML models may serve as a good approximation or proxy of the original model, which produces relatively accurate predictions of the flows in a relatively quick and efficient manner. Furthermore, such models are particularly useful for performing fast parametric simulations for purposes of optimizing well design in real-time and providing automated monitoring and control of wellsite operations.

A computer-implemented method of training neural network models for real-time flow simulations has been described. Embodiments of the method may include: acquiring input data including values for a plurality of input parameters associated with a multiphase fluid flow to be simulated; simulating the multiphase fluid flow using a complex fluid dynamics (CFD) model, based on the acquired input data, the CFD model representing a three-dimensional (3D) domain for the simulation; selecting an area of interest within the 3D domain represented by the CFD model; generating a two-dimensional (2D) mesh of the selected area of interest, the 2D mesh representing results of the simulation for the selected area of interest; and training a neural network based on the simulation results represented by the generated 2D mesh. Likewise, embodiments of a computer-readable storage medium having instructions stored therein have been described, where the instructions, when executed by a processor, may cause the processor to perform a plurality of functions, including functions to: acquire input data including values for a plurality of input parameters associated with a multiphase fluid flow to be simulated; simulate the multiphase fluid flow using a complex fluid dynamics (CFD) model, based on the acquired input data, the CFD model representing a three-dimensional (3D) domain for the simulation; select an area of interest within the 3D domain represented by the CFD model; generate a two-dimensional (2D) mesh of the selected area of interest, the 2D mesh representing results of the simulation for the selected area of interest; and train a neural network based on the simulation results represented by the generated 2D mesh.

The foregoing embodiments of the method or computer-readable storage medium may include any one or any combination of the following elements, features, functions, or operations: a deep-learning neural network (DNN) as the neural network being trained; simulating multiphase fluid flow in real time during a wellsite operation, based on the trained neural network; the wellsite operation is a stimulation treatment operation performed over different stages along a path of a wellbore through a reservoir formation, and the 3D domain represents the reservoir formation; generating further comprises identifying a 2D planar surface within the 3D domain, where the 2D planar surface includes simulation data corresponding to the selected area of interest, and applying the simulation data from the identified 2D planar surface to the 2D mesh of the selected area of interest; the selected area of interest includes a fracture network within an area of the reservoir formation surrounding the wellbore; and the simulation data is applied to nodal points of the 2D mesh.

Furthermore, embodiments of a system including at least one processor and a memory coupled to the processor have been described, where the memory stores instructions, which, when executed by a processor, may cause the processor to perform a plurality of functions, including functions to: acquire input data including values for a plurality of input parameters associated with a multiphase fluid flow to be simulated; simulate the multiphase fluid flow using a complex fluid dynamics (CFD) model, based on the acquired input data, the CFD model representing a three-dimensional (3D) domain for the simulation; select an area of interest within the 3D domain represented by the CFD model; generate a two-dimensional (2D) mesh of the selected area of interest, the 2D mesh representing results of the simulation for the selected area of interest; and train a neural network based on the simulation results represented by the generated 2D mesh.

The foregoing embodiments of the system may include any one or any combination of the following elements, features, functions, or operations: a deep-learning neural network (DNN) as the neural network being trained; simulating multiphase fluid flow in real time during a wellsite operation, based on the trained neural network; the wellsite operation is a stimulation treatment operation performed over different stages along a path of a wellbore through a reservoir formation, and the 3D domain represents the reservoir formation; generating further comprises identifying a 2D planar surface within the 3D domain, where the 2D planar surface includes simulation data corresponding to the selected area of interest, and applying the simulation data from the identified 2D planar surface to the 2D mesh of the selected area of interest; the selected area of interest includes a fracture network within an area of the reservoir formation surrounding the wellbore; and the simulation data is applied to nodal points of the 2D mesh.

While specific details about the above embodiments have been described, the above hardware and software descriptions are intended merely as example embodiments and are not intended to limit the structure or implementation of the disclosed embodiments. For instance, although many other internal components of the system 1300 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The particular embodiments described above are not intended to limit the scope of the claims. The embodiments may be modified by including, excluding, or combining one or more features or functions described in the disclosure.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The illustrative embodiments described herein are provided to explain the principles of the disclosure and the practical application thereof, and to enable others of ordinary skill in the art to understand that the disclosed embodiments may be modified as desired for a particular implementation or use. The scope of the claims is intended to broadly cover the disclosed embodiments and any such modification.

What is claimed is:

1. A computer-implemented method of training neural network models for real-time flow simulations, the method comprising:
   acquiring input data including values for a plurality of input parameters associated with a multiphase fluid flow to be simulated;
   simulating the multiphase fluid flow using a complex fluid dynamics (CFD) model, based on the acquired input data, the CFD model representing a three-dimensional (3D) domain for the simulation;
   selecting an area of interest within the 3D domain represented by the CFD model;
   generating a two-dimensional (2D) mesh of the selected area of interest, the 2D mesh representing results of the simulation for the selected area of interest;
   training a neural network based on the simulation results represented by the generated 2D mesh; wherein a size of dimensions of arrays in a training dataset for the neural network is dependent on a size of the 3D domain and the number of nodal points used for the training dataset is smaller than a number of nodal points in the 3D domain; and
   simulating multiphase fluid flow in real time during a wellsite operation using neural network trained by the simulation results represented by the generated 2D mesh.

2. The method of claim 1, wherein the neural network is a deep-learning neural network (DNN).

3. The method of claim 1, wherein the wellsite operation is a stimulation treatment operation performed over different stages along a path of a wellbore through a reservoir formation, and the 3D domain represents the reservoir formation.

4. The method of claim 3, wherein generating further comprises:
   identifying a 2D planar surface within the 3D domain, the 2D planar surface including simulation data corresponding to the selected area of interest; and
   applying the simulation data from the identified 2D planar surface to the 2D mesh of the selected area of interest.

5. The method of claim 4, wherein the selected area of interest includes a fracture network within an area of the reservoir formation surrounding the wellbore.

6. The method of claim 4, wherein the simulation data is applied to nodal points of the 2D mesh.

7. A system comprising:
   at least one processor; and
   a memory coupled to the processor, the memory storing instructions, which, when executed by the processor, cause the processor to perform a plurality of functions, including functions to:
   acquire input data including values for a plurality of input parameters associated with a multiphase fluid flow to be simulated;
   simulate the multiphase fluid flow using a complex fluid dynamics (CFD) model, based on the acquired input data, the CFD model representing a three-dimensional (3D) domain for the simulation;
   select an area of interest within the 3D domain represented by the CFD model;
   generate a two-dimensional (2D) mesh of the selected area of interest, the 2D mesh representing results of the simulation for the selected area of interest;
   train a neural network based on the simulation results represented by the generated 2D mesh; wherein a size of dimensions of arrays in a training dataset for the neural network is dependent on a size of the 3D domain and the number of nodal points used for the training dataset is smaller than a number of nodal points in the 3D domain; and
   simulate multiphase fluid flow in real time during a wellsite operation using the neural network trained by the simulation results represented by the generated 2D mesh.

8. The system of claim 7, wherein the neural network is a deep-learning neural network (DNN).

9. The system of claim 7, wherein the wellsite operation is a stimulation treatment operation performed over different stages along a path of a wellbore through a reservoir formation, and the 3D domain represents the reservoir formation.

10. The system of claim 9, wherein the functions performed by the processor further include functions to:
    identify a 2D planar surface within the 3D domain, the 2D planar surface including simulation data corresponding to the selected area of interest; and
    apply the simulation data from the 2D planar surface to the 2D mesh of the selected area of interest.

11. The system of claim 10, wherein the selected area of interest includes a fracture network within an area of the reservoir formation surrounding the wellbore.

12. The system of claim 10, wherein the simulation data is applied to nodal points of the 2D mesh.

13. A non-transitory computer-readable storage medium having instructions stored therein, which when executed by a processor cause the processor to perform a plurality of functions, including functions to:

acquire input data including values for a plurality of input parameters associated with a multiphase fluid flow to be simulated;

simulate the multiphase fluid flow using a complex fluid dynamics (CFD) model, based on the acquired input data, the CFD model representing a three-dimensional (3D) domain for the simulation;

select an area of interest within the 3D domain represented by the CFD model;

generate a two-dimensional (2D) mesh of the selected area of interest, the 2D mesh representing results of the simulation for the selected area of interest;

train a neural network based on the simulation results represented by the generated 2D mesh;

wherein a size of dimensions of arrays in a training dataset for the neural network is dependent on a size of the 3D domain and the number of nodal points used for the training dataset is smaller than a number of nodal points in the 3D domain; and simulate multiphase fluid flow in real time during a wellsite operation using neural network trained by the simulation results represented by the generated 2D mesh.

14. The non-transitory computer-readable storage medium of claim 13, wherein the neural network is a deep-learning neural network (DNN).

15. The non-transitory computer-readable storage medium of claim 13, wherein the wellsite operation is a stimulation treatment operation performed over different stages along a path of a wellbore through a reservoir formation, and the 3D domain represents the reservoir formation.

16. The non-transitory computer-readable storage medium of claim 15, wherein the functions performed by the processor further include functions to:

identify a 2D planar surface within the 3D domain, the 2D planar surface including simulation data corresponding to the selected area of interest; and apply the simulation data from the 2D planar surface to nodal points of the 2D mesh of the selected area of interest.

17. The non-transitory computer-readable storage medium of claim 16, wherein the selected area of interest includes a fracture network within an area of the reservoir formation surrounding the wellbore.

* * * * *